United States Patent
Su et al.

(10) Patent No.: US 9,650,495 B2
(45) Date of Patent: May 16, 2017

(54) MANUFACTURING METHOD FOR ENHANCING ORDERED STRUCTURE OF BLOCK COPOLYMERS

(71) Applicant: National Taiwan University, Taipei (TW)

(72) Inventors: Wei-Fang Su, Taipei (TW); Shang-Jung Wu, Taipei (TW); Chun-Chih Ho, Taipei (TW)

(73) Assignee: NATIONAL TAIWAN UNIVERSITY (TW)

( * ) Notice: Subject to any disclaimer, the term of this patent is extended or adjusted under 35 U.S.C. 154(b) by 273 days.

(21) Appl. No.: 14/167,326

(22) Filed: Jan. 29, 2014

(65) Prior Publication Data

US 2015/0099835 A1    Apr. 9, 2015

(30) Foreign Application Priority Data

Oct. 9, 2013   (TW) .............................. 102136467 A

(51) Int. Cl.
*C08K 5/45*       (2006.01)
*C08F 8/34*       (2006.01)

(52) U.S. Cl.
CPC . *C08K 5/45* (2013.01); *C08F 8/34* (2013.01)

(58) Field of Classification Search
CPC ....................................................... C08K 5/45
See application file for complete search history.

(56) References Cited

U.S. PATENT DOCUMENTS

| | | | |
|---|---|---|---|
| 6,419,858 B1* | 7/2002 | Houston ............... | C08F 265/04 264/1.1 |
| 2002/0091174 A1* | 7/2002 | Soane .................... | B32B 27/00 523/106 |
| 2005/0216074 A1* | 9/2005 | Sahatjian ................. | A61F 2/88 623/1.11 |
| 2005/0261417 A1* | 11/2005 | Mezzenga ............... | C08L 23/02 524/500 |

* cited by examiner

*Primary Examiner* — Robert Harlan
(74) *Attorney, Agent, or Firm* — Bacon & Thomas, PLLC

(57) ABSTRACT

The invention is related to a manufacturing method for enhancing an ordered structure of block copolymers, and more particularly to a thermal annealing process for block copolymers having conducting polymers and rod segments. The manufacturing method includes the following steps: (A) providing a block copolymer and a small molecule additive, wherein the block copolymer is formed of first monomers containing at least one aromatic ring and second monomers optionally containing at least one aromatic ring; and the small molecule additive is a aliphatic molecule, an aromatic molecule or a combination thereof; (B) blending the block copolymer and the small molecule additive to form a mixture; and (C) treating the mixture with a thermal annealing process to manufacture and facilitate the ordered structure of the block copolymers.

11 Claims, 2 Drawing Sheets

MANUFACTURING METHOD FOR ENHANCING ORDERED STRUCTURE OF BLOCK COPOLYMERS

CROSS REFERENCE TO RELATED APPLICATION

This application claims the benefits of the Taiwan Patent Application Serial Number 102136467, filed on Oct. 9, 2013, the subject matter of which is incorporated herein by reference.

BACKGROUND OF THE INVENTION

1. Field of the Invention

The present invention is related to a manufacturing method for enhancing an ordered structure of block copolymers, and more particularly to a thermal annealing process for block copolymers having conducting polymers and rod segments.

2. Description of Related Art

Block copolymers having an ordered structure have been widely used in lithography, molecular films, optoelectronic devices, and solar cells by taking advantage of the ordered structure. For example, in solar cells, a highly-ordered continuous phase is essential for high photoelectric conversion efficiency.

Block copolymers having self-assembly properties can form a highly ordered and periodic nanostructure, which have attracted great interest in fields related to nanotechnology. For example, in addition to the traditional stacked, hexagonal packed, and body-centered cubic structures, more complex structures may be formed, such as porous structures, bi-continuous phase structures (gyroid, i.e. Ia3d symmetric structures), diamond structures and so on.

On the other hand, novel block copolymers are generally composed of rod-coil segments or rod-rod segments, or the types of segments are increased to form a tri-block copolymer, and even a multi-block copolymer. The molecular structure of the rod segment is difficult to twist or deform, and therefore has high planarity. However, the strong intermolecular $\pi$-$\pi$ stacking or van der Waals force results in a very long annealing time and an overly high annealing temperature for such block copolymer molecules to be arranged into a highly ordered structure. The overly-high annealing temperature may even cause degradation of the block copolymer molecules. It has been reported that the problem can be solved by changing the chemical structure of the block copolymer, which however, deteriorates the application-associated properties, such as opto-electrical characteristics, charge conductivity and so on.

Therefore, it is a bottleneck to effectively reduce the time and temperature of the annealing process without changing the material structure per se. Therefore, the present invention provides a manufacturing method, wherein an additive, i.e., a small molecule additive, which is miscible with the block copolymer containing the rod segment, such that during the subsequent thermal annealing process, the small organic molecule may provide a solution-like environment to the rod segment, thereby reducing $\pi$-$\pi$ interaction or van der Waals force. The small molecule additive may volatilize during the thermal annealing process or high vacuum condition without remaining in the block copolymers. As such, the ordered structure of the block copolymers is manufactured and the subsequent applications of the block copolymer can be maintained.

SUMMARY OF THE INVENTION

An object of the present invention is to provide a manufacturing method for enhancing ordered structure of block copolymers, which is particularly related to a thermal annealing process for block copolymers having conducting polymers and rod segments. The manufacturing method of the present invention includes the following steps: (A) providing a block copolymer and a small molecule additive, wherein the block copolymer is formed of a first monomer containing at least one aromatic ring, and a second monomer optionally containing at least one aromatic ring; and the small molecule additive may be a aliphatic molecule, an aromatic molecule or a combination thereof; (B) blending the block copolymer and the small molecule additive to form a mixture; and (C) treating the mixture with a thermal annealing process to manufacture and facilitate the ordered structure of the block copolymers.

In the present invention, the block copolymer may be formed of the first monomers and the second monomers, and the number of the monomers for forming a block copolymer is not particularly limited as long as the block copolymer can be suitably formed.

In an embodiment of the present invention, the segment formed of the first monomer may refer to a rod segment having a main chain containing at least one aromatic ring, and a $\pi$ resonance system or Van der Waals force interaction is formed; while the segment formed of the second monomer may refer to a coil segment having a main chain containing no aromatic ring, and no $\pi$ resonance system is formed between its polymerized monomers.

In another embodiment of the present invention, the segment formed of the first monomer may refer to a rod segment having a main chain containing at least one aromatic ring, and a $\pi$ resonance system or Van der Waals force interaction is formed between its polymerized monomers; while the segment formed of the second monomer may also refer to a rod segment having a main chain containing at least one aromatic ring, and a $\pi$ resonance system or Van der Waals force interaction is formed between its polymerized monomers, wherein the segment formed of the first monomer and the segment formed of the second monomer may be similar to, or different from each other.

Also, the linkage between the segment formed of the first monomer and the segment formed of the second monomer is not particularly limited, as long as the block copolymer can be suitably formed.

In addition, the aromatic rings of the first monomers, the second monomers, and the small molecule additive may be similar to, the same as, or different from each other. The small molecule additive can be either aromatic molecule or aliphatic molecule or a combination thereof. The aromatic rings of the first monomers, the second monomers, and the small aromatic molecule additive may be each independently selected from the group consisting of: a substituted or unsubstituted heterocyclic aromatic ring, such as a substituted or unsubstituted thiophene, a substituted or unsubstituted furan, a substituted or unsubstituted pyrrole, a substituted or unsubstituted imidazole, a substituted or unsubstituted oxazole, a substituted or unsubstituted thiazole, a substituted or unsubstituted pyrimidine, and a substituted or unsubstituted pyrazine; a substituted or unsubstituted homocyclic aromatic ring, such as a substituted or unsubstituted benzene, a substituted or unsubstituted pyridine; and a substituted or unsubstituted polycyclic aromatic ring, such as a substituted or unsubstituted fluorene, benzothiophene and benzo[c]thiophene. However, the present invention is not limited thereto, and the small molecular additive preferably has the same, or similar aromatic ring as the first monomer or the second monomer.

Furthermore, the hetero atom of the heterocyclic aromatic and the polycyclic aromatic may further include one selected from the group consisting of: nitrogen, oxygen, sulfur, selenium, phosphorus, and boron, and preferably, the hetero atom is sulfur, oxygen, nitrogen, silicon, or germanium.

Also, the substituents may be each independently selected from the group consisting of: a $C_{1-30}$ alkyl group, a $C_{3-30}$ cycloalkyl group, a $C_{3-30}$ heterocycloalkyl group, a $C_{6-30}$ aryl group, a $C_{5-30}$ heteroaryl group, —$R_1COOR_1'$, —$R_2COR_2'$, and —$R_3$—O—$R_3'$, wherein $R_1$, $R_2$ and $R_3$ may be each independently a bond or a $C_1$-$C_{30}$ alkyl group, and $R_1'$, $R_2'$ and $R_3'$ may be each independently hydrogen or a $C_{1-30}$ alkyl group.

Specifically, for example, the first monomer segment formed of the first monomer may be selected from the group consisting of: polythiophene; $C_1$-$C_{30}$ alkyl-containing poly (3-alkylthiophene), such as $C_{12}$ alkyl-containing poly(3-alkylthiophene); polyfluorene; and poly(phenylvinylene); and may include at least one segment formed of the aromatic ring selected from the group consisting of the following monomers: a substituted or unsubstituted thiophene, a substituted or unsubstituted furan, a substituted or unsubstituted pyrrole, a substituted or unsubstituted imidazole, a substituted or unsubstituted oxazole, a substituted or unsubstituted thiazole, a substituted or unsubstituted pyridine, a substituted or unsubstituted pyrimidine, and a substituted or unsubstituted pyrazine; a substituted or unsubstituted homocyclic aromatic ring, such as a substituted or unsubstituted benzene; substituted group, and a substituted or unsubstituted polycyclic aromatic ring, such as a substituted or unsubstituted fluorene, benzothiophene and benzo[c]thiophene, wherein the substituents are the same as defined above, and thus will not be repeated here.

When the second monomer segment formed of the second monomer is the coil segment, the specific examples of the second monomer may be selected from the group consisting of poly(methyl methacrylate) (PMMA), polycarbonate (PC), polypropylene (PP), polyamide (PA), polydimethylsiloxane (PDMS), polyethylene terephthalate (PET), polyethylene (PE), polystyrene (PS) and polyethylene glycol (PEG). When the second monomer segment formed of the second monomer is the rod segment, the specific examples of the second monomers may be selected from the group consisting of: polythiophene; $C_1$-$C_{30}$ alkyl-containing poly(3-alkylthiophene), such as $C_{12}$ alkyl-containing poly(3-alkylthiophene); polyfluorene; and poly(phenylvinylene); and may include at least one segment formed of the aromatic ring selected from the group consisting of the following monomers: a substituted or unsubstituted thiophene, a substituted or unsubstituted furan, a substituted or unsubstituted pyrrole, a substituted or unsubstituted imidazole, a substituted or unsubstituted oxazole, a substituted or unsubstituted thiazole, a substituted or unsubstituted pyridine, a substituted or unsubstituted pyrimidine, and a substituted or unsubstituted pyrazine; a substituted or unsubstituted homocyclic aromatic ring, such as a substituted or unsubstituted benzene; and a substituted or unsubstituted polycyclic aromatic ring, such as a substituted or unsubstituted fluorene, benzothiophene and benzo[c]thiophene, wherein the substituents are the same as defined above, and thus will not be repeated here. However, the present invention is not limited thereto. In addition, the first monomer and the second monomer may be similar to or different from each other; and preferably different from each other.

In another embodiment of the invention, in addition to the first monomer and the second monomer, the block copolymer may further include a segment formed of third monomer optionally containing at least one aromatic ring, wherein the segment formed of the third monomer may be a coil segment or a rod segment, and the segments formed of the third monomer and the first monomer or the second monomer may be similar to, or different from each other. Here, in the case that the segment formed of the third monomer is a rod segment, this rod segment has a main chain containing at least one aromatic ring, and a π resonance system or van der Waals force interaction is formed. Preferably, at least one of the monomers is different from the others.

In the present invention, the terms "first monomer", "second monomer", and "third monomer" refer to monomers which are similar to, the same as, or different from each other in order for the disclosure of the present invention to be more easily realized, but not to limit the number of monomers used in the present invention or the segment formed therefrom. In addition, the choice of the third monomer may be selected from those of the first monomer, the second monomer, or the combination thereof, and the linkage between the segment formed of the third monomer and the segment formed of the first monomer as well as the segment formed of the second monomer is not particularly limited, and can be the same as the linkage between the segment formed of the first monomer and the segment formed of the second monomer, thus being not repeated here. Also, the term "similar" refers to the conditions that the monomers are isomers or have a substituent of different structures, such as a different carbon chain length, for example, $C_{1-30}$ alkyl group.

In this invention, the specific example of the small molecule additive is selected from the group consisting of: polythiophene, $C_{1-30}$ alkyl-containing 3-alkylthiophene or $C_{6-12}$ alkyl-containing poly(3-alkylthiophene), such as $C_{12}$ alkyl-containing poly(3-alkylthiophene); dialkylphthalate; butyl benzyl phthalate (BBzP); and di(2-ethylhexyl) phthalate (DEHP). Generally, the small molecule additive can be applied to the present invention, as long as it does not volatilize immediately during annealing, and its boiling point, for example, may be about 45° C. or more, preferably about 70° C. or more, more preferably about 150° C. or more, and even most preferably about 200° C. or more. However, the present invention is not limited thereto In the present invention, the term "alkyl group" refers to a linear or branched univalent hydrocarbon group. The term "heterocycloalkyl group" refers to a univalent non-aromatic 5 to 8-membered monocyclic structure, an 8 to 12-membered bicyclic structure or an 11 to 14-membered tricyclic structure, having one or more heteroatoms selected from the group consisting of nitrogen, oxygen, sulfur, selenium, phosphorus, and boron. The term "aryl group" refers to a univalent $C_6$ monocyclic, $C_{10}$ bicyclic, or $C_{14}$ tricyclic aromatic ring, and the example of aryl may include but is not limited to: phenyl, naphthyl, and anthryl. The "heteroaryl group" refers to a univalent aromatic 5 to 8-membered monocyclic, 8 to 12-membered bicyclic or 11 to 14-membered tricyclic structure, having one or more heteroatoms selected from the group consisting of nitrogen, oxygen, sulfur, selenium, phosphorus, silicon, germanium, and boron.

Further, as described in the above step (C), the temperature of the thermal annealing process may be 25-400° C., or 25-300° C., adjusted according to different block copolymers, and for example, according to an embodiment, the temperature of the thermal annealing process is 110-170° C.

In addition, the thermal annealing process may be performed for 1 to 30 hours, also adjusted according to different block copolymers. Taking poly(3-dodecylthiophene)-block-poly (methyl methacrylate (P3DDT-b-PMMA) as an example, the thermal annealing process is preferably performed at a temperature of 130-150° C. for 1 to 25 hours. However, the present invention is not limited thereto.

Furthermore, the block copolymer and the small molecule additive may be added at a weight ratio of 1 to 40, adjusted based on the different block copolymer, for example, according to an embodiment, at a weight ratio of 1 to 10, or 2 to 4.

Therefore, according to an embodiment of the present invention, the time and temperature of the thermal annealing process required for the block copolymer with rod segment to form an ordered structure can be reduced. On the premise that the polymer molecule structure is not changed to affect its subsequent applications or physical properties, the energy barrier of the segment motion is substantially reduced by reducing π-π interaction or van der Waals force between the copolymers containing the rod segment. Accordingly, an additive, e.g. the small molecule additive, which may be miscible with the block copolymer containing the rod segment is blended into the block copolymer, such that during the subsequent thermal annealing process, the small organic molecule may provide a solution-like environment to the rod segment, and may volatize during, or after the thermal annealing process without remaining in the block copolymer. As such the ordered structure of the block copolymers is rapidly manufactured and the applications of the block copolymer can be maintained.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

In the following description, numerous specific details are set forth to provide a thorough understanding of embodiments of the present disclosure. However, one having an ordinary skill in the art will recognize that embodiments of the disclosure can be practiced without these specific details. In some instances, well-known structures and processes are not described in detail to avoid unnecessarily obscuring embodiments of the present disclosure.

EXAMPLE

Poly(3-dodecylthiophene)-block-poly(methyl methacrylate) (P3DDT-b-PMMA) (the volume fraction of PMMA was 0.63) was used as the block copolymer sample, having a structural formula of Formula 1, and blended with a small molecule additive, 3-dodecylthiophene (3DDT), having a structural formula of Formula 2. Based on the total weight of P3DDT-b-PMMA and 3DDT, 30 wt % of 3DDT (or a weight ratio of P3DDT-b-PMMA: 3DDT=4:1 to 2:1) was placed in a flask, and THF (tetrahydrofuran) is added to prepare a THF solution having a concentration of about 200 mg/mL (wherein the solutes were the mixtures of the block copolymer and the small molecule additives). The solution was stirred in a water bath at 45° C. for four hours, and left standing for at least 3 days after removing the stirrer. Thereafter, the solution was heated to 60° C. under an argon atmosphere, and maintained at 60° C. for four hours to ensure that there was no residual THF. Then, the sample was heated to 140° C. under an argon atmosphere and maintained at 140° C. for 21 hours, to obtain a highly ordered structure.

[Formula 1]

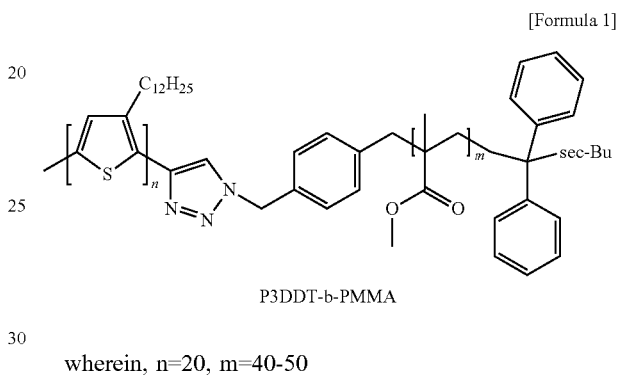

P3DDT-b-PMMA wherein, n=20, m=40-50

[Formula 2]

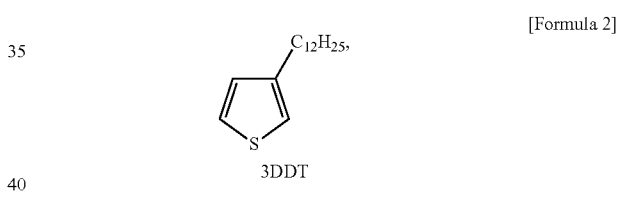

3DDT

Comparative Example

The process similar to the Example illustrated above was repeated, except that the block copolymer sample was not blended with the small molecule additive 3-dodecylthiophene (3DDT).

Sample Analysis

Figure 1:
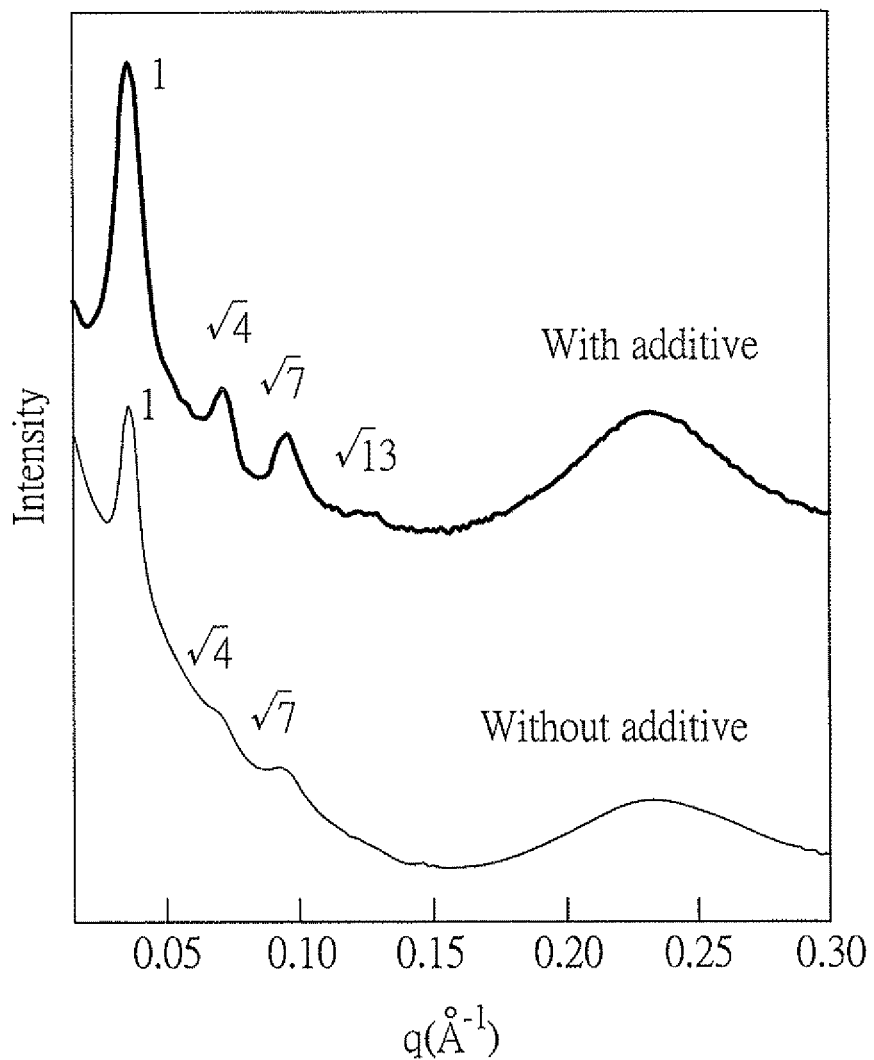
FIG. 1 is the small-angle X-ray scattering spectra of P3DDT-b-PMMA according to the example of the present invention, showing the difference in the degree of ordering between the cases with and without the addition of the small molecule additive.

The structure and the degree of ordering of material were tested by the small angle X-ray scattering spectrometer (SAXS) (FIG. 1). $1:\sqrt{4}:\sqrt{7}:\sqrt{13}$ of the peak ratio is present, indicating that the structure is a hexagonal packed cylinder. In the case without the addition of 3DDT, only $\sqrt{7}$ peak ratio was observed while the addition of $\sqrt{13}$ peak ratio was observed with the addition of 3DDT. Since the appearance of the highly ordered sub-peak, and each of the peaks has a stronger intensity, it can be confirmed that the ordered structure of the block copolymer sample blended with 3DDT can be completed easily by annealing at 140° C. for 21 hours.

Figure 2:
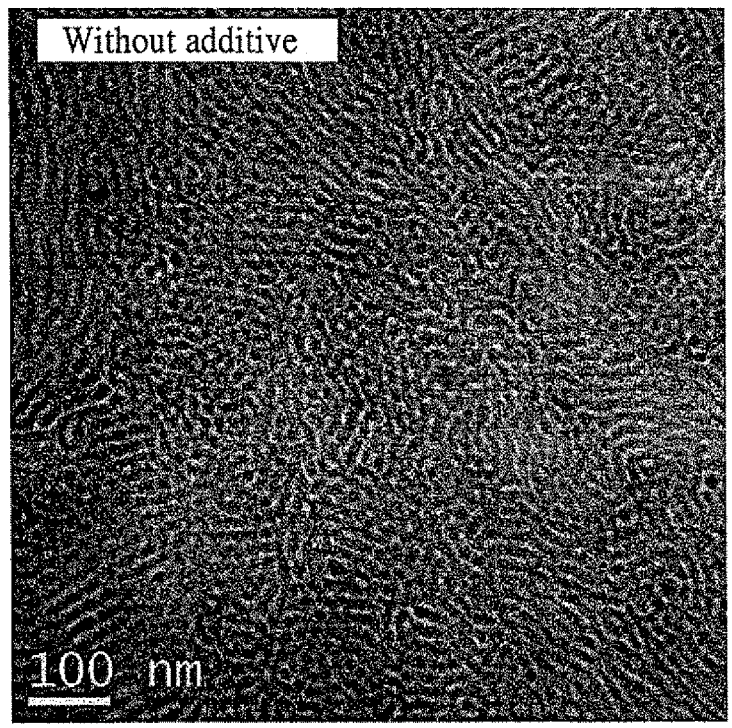
FIG. 2 is the transmission electron microscope image of P3DDT-b-PMMA according to the example of the present invention, wherein the top and bottom diagrams represent the nanostructures of the block copolymers with and without the addition of the small molecule additives, respectively.
Figure 2:
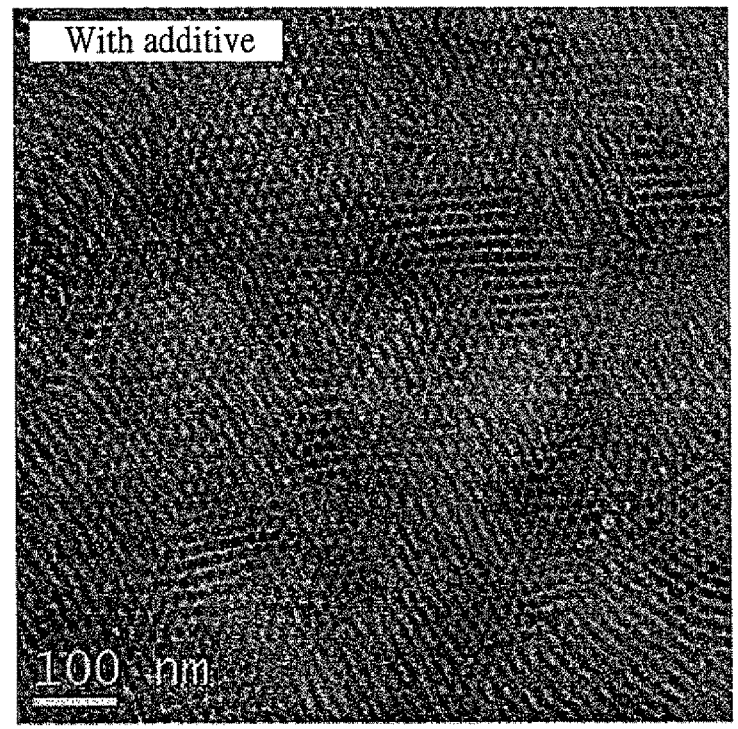

Then, the ordering of the sample was further examined by the transmission electron microscopy (TEM) (FIG. 2), wherein the dark area is P3DDT area and the bright area is PMMA area due to the ruthenium tetraoxide staining on P3DDT. The top diagram shows the result of Comparative Example without the addition of 3DDT, and it can be found that material still had a disordered structure and many defects after annealing. The bottom diagram of FIG. 2 shows the result of Example with the addition of 3DDT, wherein the structure of material represents a hexagonal packed cylinder, significantly different from the result without the addition of 3DDT. The results of TEM and the structure illustrated by SAXS spectra are consistent with each other.

The results indicate that the present invention provides a manufacturing method for enhancing an ordered structure of block copolymers. The addition of a small molecule additive not only reduces the temperature and time of the annealing process but also provides a better ordered structure to the block copolymers.

It should be understood that these examples are merely illustrative of the present invention and the scope of the invention should not be construed to be defined thereby, and the scope of the present invention will be limited only by the appended claims.

What is claimed is:

1. A manufacturing method for enhancing an ordered structure of block copolymers, sequentially comprising the following steps:
    (A) providing a block copolymer and a molecule additive, wherein the block copolymer is formed of a first monomer containing at least one aromatic ring, and a second monomer optionally containing at least one aromatic ring, the first monomer and the second monomer are different; the molecule additive is a aliphatic molecule, an aromatic molecule or a combination thereof; and the aromatic rings of the first monomer, the second monomer, and the molecule additive are each independently selected from the group consisting of: a substituted or unsubstituted heterocyclic aromatic ring, a substituted or unsubstituted homocyclic aromatic ring, and a substituted or unsubstituted polycyclic aromatic ring
    (B) blending the block copolymer and the molecule additive to form a mixture; and
    (C) treating the mixture with a thermal annealing process to manufacture and facilitate the ordered structure of the block copolymers.

2. The manufacturing method of claim 1, wherein the aromatic rings of the first monomer, the second monomer and the molecule additive are similar to, the same as, or different from each other.

3. The manufacturing method of claim 1, wherein the aromatic rings of the first monomer, the second monomer, and the molecule additive are each independently selected from the group consisting of: a substituted or unsubstituted thiophene, a substituted or unsubstituted furan, a substituted or unsubstituted pyrrole, a substituted or unsubstituted imidazole, a substituted or unsubstituted oxazole, a substituted or unsubstituted thiazole, a substituted or unsubstituted benzene, a substituted or unsubstituted pyridine, a substituted or unsubstituted pyrimidine, and a substituted or unsubstituted pyrazine.

4. The manufacturing method of claim 1, wherein the substituents are each independently selected from the group consisting of: a $C_{1-30}$ alkyl group, a $C_{3-30}$ cycloalkyl group, a $C_{3-30}$ heterocycloalkyl group, a $C_{6-30}$ aryl group, a $C_{5-30}$ heteroaryl group, —$R_1COOR_1'$, —$R_2COR_2'$, and —$R_3$—O—$R_3'$, wherein $R_1$, $R_2$ and $R_3$ are each independently a bond or a $C_{1-30}$ alkyl group, and $R_1'$, $R_2'$ and $R_3'$ are each independently hydrogen or a $C_{1-30}$ alkyl group.

5. The manufacturing method of claim 3, wherein the substituents are each independently selected from the group consisting of: a $C_{1-30}$ alkyl group, a $C_{3-30}$ cycloalkyl group, a $C_{3-30}$ heterocycloalkyl group, a $C_{6-30}$ aryl group, a $C_{5-30}$ heteroaryl group, —$R_1COOR_1'$, —$R_2COR_2'$, and —$R_3$—O—$R_3'$, wherein $R_1$, $R_2$ and $R_3$ are each independently a bond or a $C_{1-30}$ alkyl group, and $R_1'$, $R_2'$ and $R_3'$ are each independently hydrogen or a $C_{1-30}$ alkyl group.

6. The manufacturing method of claim 1, wherein the block copolymer is formed of the first monomer and the second monomer, and a first monomer segment formed of the first monomer is selected from the group consisting of: polythiophene, C1-30 alkyl-containing poly(3-alkylthiophene), polyfluorene, and poly(phenylvinylene); and a second monomer segment formed of the second monomer is selected from the group consisting of: poly(methyl methacrylate) (PMMA), polycarbonate (PC), polypropylene (PP), polyimide (PA), polydimethylsiloxane (PDMS), polyethylene terephthalate (PET), polyethylene (PE), polystyrene (PS) and polyethylene glycol (PEG).

7. The manufacturing method of claim 1, wherein the molecule additive is selected from the group consisting of: polythiophene, $C_{1-30}$ alkyl-containing 3-alkylthiophene, dialkylphthalate, butyl benzyl phthalate (BBzP), and di(2-ethylhexyl) phthalate (DEHP).

8. The manufacturing method of claim 1, wherein the molecule additive has a boiling point of 45° C. or more.

9. The manufacturing method of claim 1, wherein the thermal annealing process is performed at a temperature of 25-400° C.

10. The manufacturing method of claim 1, wherein the thermal annealing process is performed for 1-30 hours.

11. The manufacturing method of claim 1, wherein the block copolymer and the molecule additive are blended in a weight ratio of 1 to 40.

* * * * *